(12) United States Patent
Perry et al.

(10) Patent No.: US 6,880,074 B2
(45) Date of Patent: Apr. 12, 2005

(54) IN-LINE CODE SUPPRESSION

(75) Inventors: Patrick E. Perry, Shelburne, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 09/681,077

(22) Filed: Dec. 22, 2000

(65) Prior Publication Data

US 2002/0103992 A1 Aug. 1, 2002

(51) Int. Cl.⁷ ............................. G06F 9/45; G06F 9/54; G06F 9/445
(52) U.S. Cl. ............... 712/248; 712/213; 712/229; 712/227; 717/131; 717/161
(58) Field of Search ............................. 712/213, 227, 712/229, 248, 226, 245, 207, 223, 224, 233, 236; 717/131, 161, 132, 156, 133, 121; 455/445

(56) References Cited

U.S. PATENT DOCUMENTS

| | | | |
|---|---|---|---|
| 4,298,933 A | 11/1981 | Shimokawa et al. | |
| 4,514,804 A | 4/1985 | Kimoto | |
| 5,434,986 A | 7/1995 | Kusiak et al. | |
| 5,448,746 A | 9/1995 | Eickemeyer et al. | |
| 5,452,469 A | * 9/1995 | Sone et al. .................. | 712/245 |
| 5,488,688 A | 1/1996 | Gonzales et al. | |
| 5,491,793 A | 2/1996 | Somasundaram et al. | |
| 5,590,354 A | 12/1996 | Klapproth et al. | |
| 5,598,421 A | 1/1997 | Tran et al. | |
| 5,623,502 A | 4/1997 | Wang | |
| 5,644,759 A | 7/1997 | Lucas et al. | |
| 5,724,505 A | 3/1998 | Argade et al. | |
| 5,867,699 A | * 2/1999 | Kuslak et al. ............... | 712/240 |
| 5,996,070 A | * 11/1999 | Yamada et al. ............. | 712/236 |
| 6,097,955 A | * 8/2000 | Bhat .......................... | 455/445 |

OTHER PUBLICATIONS

IBM Technical Disclosure Bulletin; vol. 38, No. 11; Nov. 1995; pp. 65–67.

* cited by examiner

*Primary Examiner*—Dan Pan
(74) *Attorney, Agent, or Firm*—Whitham, Curtis & Christofferson, P.C.; Richard A. Henkler

(57) ABSTRACT

Processor overhead is reduced and processor performance, particularly processing speed and power savings, is improved, allowing real-time processor restarts, by skipping operational codes (opcodes) singly or in groups in accordance with one or more execution bits set during post-processing in opcodes preceding opcodes to be skipped. Thus portions of an application program which consume excessive power or are unsupported in particular operating environments can be easily and selectively de-activated while maintaining the integrity of the applications program. Local or cache memory is also effectively expanded and processor performance improved by eliminating opcodes from local or cache memory which will not be called.

10 Claims, 2 Drawing Sheets

IN-LINE CODE SUPPRESSION

BACKGROUND OF THE INVENTION

1. Field of the Invention

The present invention generally relates to the operation of digitally controlled electronic devices such as digital data processors, digital processor controlled "smart" devices and the like operable in a plurality of modes and, more particularly, reduction of software code overhead based on operational mode.

2. Description of the Prior Art

Portable personal computers and many other conveniences that include digital processors (e.g. processor controlled measurement devices, smart pagers, "palm-top" devices and the like) are widely available and used in many different environments. Demands for increased functionality and sophisticated graphic user interfaces have required applications programs used in such devices which can be very large. Further, it is common for a plurality of applications programs to be available concurrently on such devices.

At the present time, the cost of software can be a major portion of the cost of the device and constitute a major portion of the processor overhead, limiting performance and often greatly extending initialization time when such a device is started. Initialization procedures generally include extended testing for operational mode parameters and connected devices which may or may not be supported by the application. Results of this testing are generally stored in a configuration table that is interrogated each time particular functions of the application are run and generally result in a plurality of conditional branches to perform the function; thus consuming substantial processing time during both initialization and execution of an application program. This amount of processing time may be particularly critical when it may become necessary to re-start the processor and certainly prevents re-starting from being accomplished in real time.

Further, such overhead may not be fully consistent with desired operational environments and modes. For example, during operation of a portable personal computer on battery power, it is desirable to minimize power consumption. However, the processing overhead for maintaining availability of all software may be less desirable than extending the period of possible operation on battery power, particularly since a full complement of peripherals are much less likely to be connected when, for example, a lap-top computer is used in an environment where battery power is necessary.

Thus, it may be desirable to reduce processor overhead by limiting the amount of code decoded and/or stored for possible use. For example, code such as routines involving complex graphic user interfaces, printer drivers when no printer is connected, communications arrangements when no network access is available and the like, which are not accessed in certain operating modes (but which must be included in the applications to support the full extent of desired functionality in other operating modes and environments where, for example, power consumption is of lower importance) may be suppressed and effectively removed from the application. Conversely, when a device is connected to normal alternating current power sources, it may be desirable to disable certain power-saving features such as display blanking that may be inconvenient to a user.

At the present time, such code can exceed well in excess of 10% of the instruction stream of an application. If the application is to support many different configurations, such codes that may be desirable to disable are usually distributed in the application with an in-line granularity that makes it difficult to turn on or turn off individual operations or sections of code. Current operating systems impose the constraint of maintaining the complete code, including all possibly needed conditional branch trees (sometimes referred to as code cones) of an application for testing for operational mode parameters and identifying attached peripheral devices and then determine what functions are to be enabled. This circumstance is aggravated by the increasing number of ports which may be made available for connection of peripheral devices.

Due to the nature of the start-up code a large processing overhead and power drain may be imposed when an application is started when only small sections of code or single operations (opcodes) may require suppression, although the number of opcodes and small sections of code to be suppressed may be very numerous. Therefore, even configuring the system to limit power consumption imposes a significant power requirement. More specifically, at start-up, processors need to determine which functions are supported or have been changed. Usually, the processor follows a series of branch trees to test either memory locations or device status bits and then allow a section of code to be executed or skipped during the current power-on machine cycles depending on the results of the tests. Each time the code enters a turned-off domain, re-running of a test may be required and the code branched around at the cost of execution time and power.

Moreover, the amount of time required for this processing is significant and real-time re-starting of digital processors is not currently possible. Reduction of re-start time has generally been approached by limiting the amount of testing performed on the processor and associated memory and thus may not ensure reliable operation. Nevertheless, many applications have been identified such as machine or vehicle control where re-start time may be extremely critical.

BRIEF SUMMARY OF THE INVENTION

It is therefore an object of the present invention to provide a technique for suppression of single opcodes or complete blocks of code that can be skipped in order to disable their function and eliminate processing overhead associated therewith and thus requiring only minimal processor overhead.

It is another object of the invention to provide a technique of improving processor performance, such as reduced power consumption or increased speed, by suppressing opcodes and sections of code which may limit desired performance relative to some operating environments or which are not related to functions supported by a given configuration.

It is a further object of the invention to provide particular functions to be selectively enabled or disabled without deletion of instruction code from application programs.

It is yet another object of the invention to reduce processor start-up and re-start ime without reducing functional testing of the processor, memory and associated peripheral devices.

In order to accomplish these and other objects of the invention, a method of operating a digital system controlled by operation codes and operable in a plurality of operational modes is provided comprising steps of processing an application program to insert execution bits in operational codes preceding instructions which are not used in particular operational modes, evaluating each operational code prior to decoding of said each operational code, skipping an operational code responsive to detecting a particular state of an execution bit in a preceding instruction, and decoding remaining operational codes.

In accordance with another aspect of the invention, a processor is provided comprising a sequence of instructions, each said instruction including an execution bit, and means for bypassing an instruction of said sequence based on a particular state of an execution bit in a current instruction.

BRIEF DESCRIPTION OF THE SEVERAL VIEWS OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
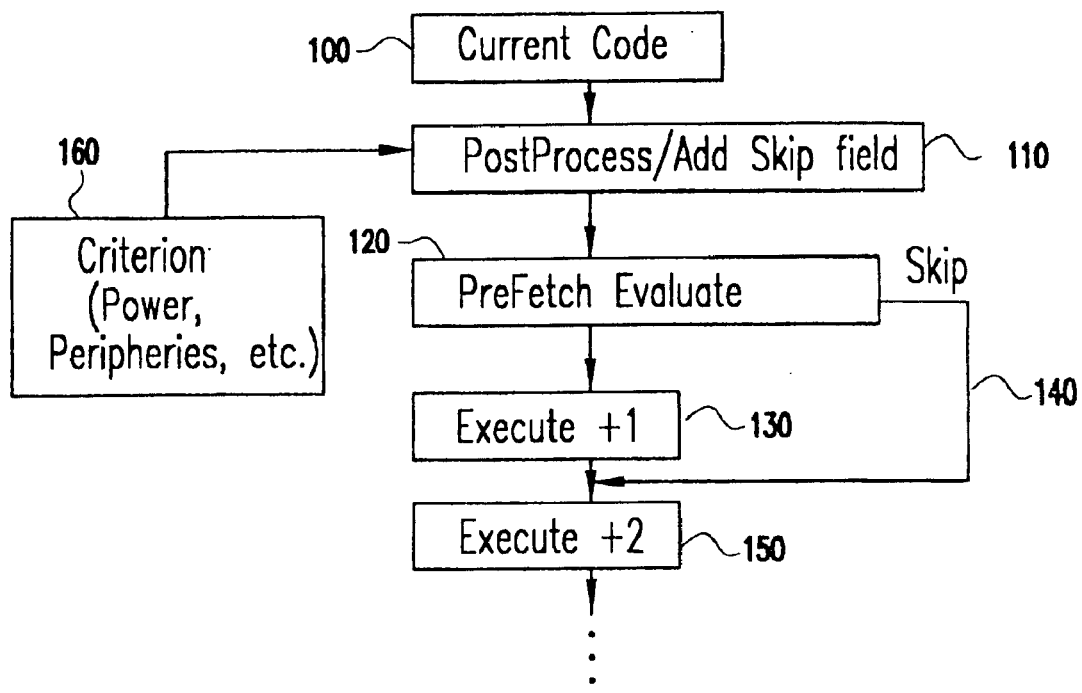
FIG. 1 is a simplified block diagram illustrating operation of the invention.

Referring now to the drawings, and more particularly to FIG. 1, there is shown a high level block diagram illustrating operation of the invention. The invention begins with current code 100 of an application which must be fetched from storage prior to being executed by a processor. Normally lines or blocks of code are fetched from a mass memory, decoded and stored into a smaller electronic memory from which they may be obtained as needed in less time than that required for a fetch from mass memory.

The invention is preferably implemented by post-processing (e.g. processing after the application is built and compiled) program code 100 as shown at 110 to set an execution bit associated with the operation code (opcode) immediately prior to the opcode to be suppressed. This processing of the application code can be done in many ways, the details of which are not critical to the practice of the invention. However, it is preferred to perform the processing based on a previous operating state of the processor which may be input as various criteria 160 to determine whether a particular opcode or section of code will be used.

When this execution bit is active, the next opcode is regarded as a "don't care", as detected by pre-fetch evaluation 120. Thus, when the opcode with the active execution bit active reaches the pre-decode stages the program counter is incremented (140) over the next instruction 130 to instruction 150 and instruction 130 is suppressed and not decoded or otherwise used by the processor or stored for processor use; thus eliminating processor overhead associated therewith and even the decoding overhead associated with the suppressed codes.

Figure 2:
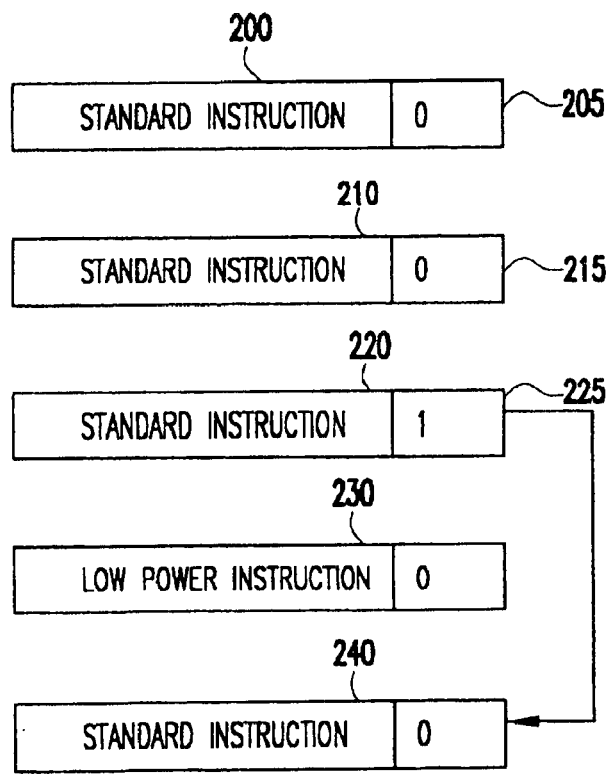
FIG. 2 is a schematic illustration of the operation of a simple implementation of the invention.

This mode of operation is illustrated in greater detail in FIG. 2. Standard instructions 200 and 210 have their execution bits 205, 215 set at "0" (inactive) and are handled and decoded normally and in sequence. Standard operation 220 is also handled normally but since the execution bit 225 is set to "1" (active), low power instruction 230 is skipped/bypassed (regardless of the state of its execution bit) and decoding proceeds with standard instruction 240 and following instructions in sequence. If the execution bit of standard instruction 240 was previously set to "1", however, the next instruction following instruction 240 would be skipped/bypassed.

In essence, this process makes a conditional branch available at every opcode so that selected lines of code can be suppressed easily, simply and flexibly with virtually no processing or decoding overhead. This effect of the invention can also be viewed as substituting the conditional branch provided by the invention for one or more (and potentially many) conditional branches executed each time particular functions are required based on operating mode and configuration data collected during initialization. That is, for each operating mode, function or supported device, a single conditional branch is made to suppress code prior to decoding and running the application program and thus avoid potentially many more time-consuming conditional branch instructions that may be repetitively executed during initialization and execution of the application program.

Figure 3:
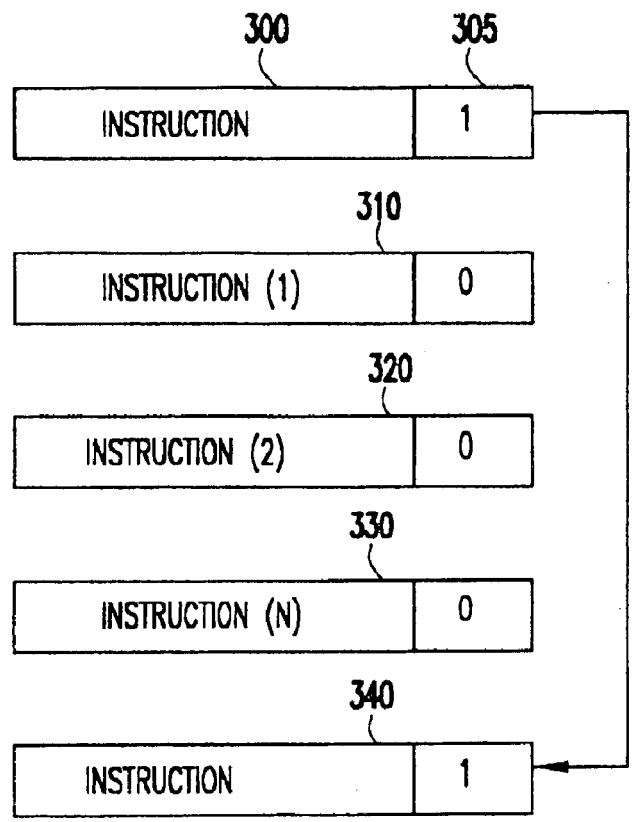
FIG. 3 is a schematic illustration of a second implementation or alternative function to that of FIG. 2 in accordance with the invention.
Figure 4:
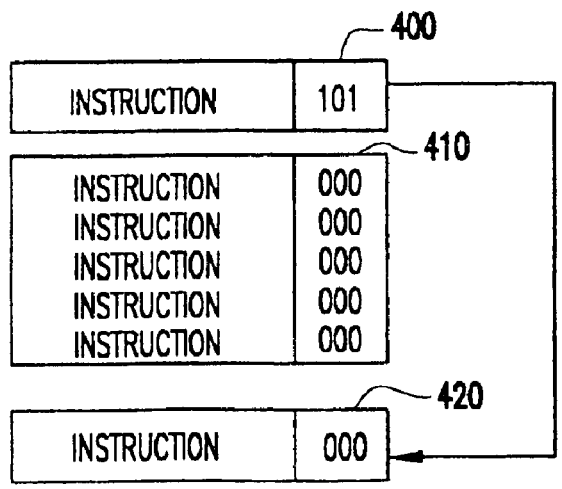
FIG. 4 is a schematic illustration of a third implementation or alternative function to that of FIG. 2 in accordance with the invention.

The process of suppressing a single opcode discussed above in regard to FIG. 2 can be extended to blocks of data in several ways; preferred, exemplary techniques being illustrated in FIGS. 3 and 4. For example in FIG. 3 setting of the execution bit of instruction 300 causes all following instructions 310, 320, 330 to be skipped until another active execution bit is encountered in instruction 340. This control can be very simply exercised by toggling a status bit in a register in accordance with active execution bits of respective instructions and determining whether skipping is to be performed by comparison of the status bit with the execution bit. In this manner, instructions in blocks can be iteratively skipped in a simple manner using only a single execution bit per instruction.

Alternatively, as shown in FIG. 4, more than one execution bit is provided and may be used to store an offset address. When such a group of execution bits is encountered in, for example, instruction 400, the program counter is incremented by that number to provide the address/sequential location of the next instruction to be decoded. Thus, the process can branch directly to instruction 420 while skipping block 410. This process is faster than that of FIG. 3, discussed above, since the skipping/conditional branch process is direct rather than iterative but requires provision and setting of additional execution bits.

It should be appreciated that the skipping of instructions has no effect on accessibility of remaining instructions from a memory local to the processor such as a working memory. All instructions remain in correct sequence in the application program and are accessible from main memory such as a mass storage in the usual manner. As the instructions are evaluated prior to decoding the skipped instructions are not decoded and the remaining instructions are decoded and the result stored in local memory while address translation data is accumulated in a look-up table to translate the addresses of the original program sequence to the address in local memory, as is known in the art. However, a meritorious effect of applying the invention in such a known environment is that the memory local to the processor, such as a cache, is not necessarily burdened with storing the skipped instructions and thus can be effectively expanded in capacity; increasing cache/local memory hit rates and processor performance. However, it is often preferable to store the skipped instructions in the program stream but simply to suppress decoding in order to avoid the processing overhead associated therewith.

In view of the foregoing, it is seen that the invention provides a simple and easily implemented technique of improving processor performance by reducing instruction code maintenance overhead with little, if any, burden on the processor from its implementation. The reduction in processing overhead is sufficient to support the function of real-time processor restarts since the effects of the invention on processor performance are particularly evident during initialization operations because no deactivation of individual opcodes and code segments is required because they have been effectively removed from the code stream before reaching the processor. Power savings are also achieved since no processing is required to maintain opcodes or code segments which are not supported by a particular operating environment or mode.

While the invention has been described in terms of a single preferred embodiment, those skilled in the art will recognize that the invention can be practiced with modification within the spirit and scope of the appended claims.

What is claimed is:

1. A method of operating a digital system controlled by operation codes and operable in a plurality of operational modes, said method comprising steps of processing an application program to insert execution bits in operational codes preceding instructions which are not used in ones of said plurality of modes, evaluating each operational code prior to decoding of said each operational code, skipping an operational code responsive to detecting a particular state of an execution bit in a preceding instruction, and decoding remaining operational codes.

2. A method as recited in claim 1, wherein said processing is performed in response to a criterion representing one of an operating mode, a function and a peripheral device connected to said digital system.

3. A method as recited in claim 2, wherein said skipping step skips a single operational code following said preceding instruction.

4. A method as recited in claim 2, wherein said skipping step skips all operations between said preceding instruction and another instruction having an execution bit having said particular state.

5. A method as recited in claim 4, wherein said skipping step is performed by toggling a bit in a register upon detection of an activation bit in said particular state and iteratively comparing execution bits of instructions with said bit in said register.

6. A method as recited in claim 2, wherein a plurality of execution bits are provided in each instruction by said processing step and said skipping step is performed in accordance with a number represented by said plurality of execution bits.

7. A method as recited in claim 1, wherein said skipping step skips a single operational code following said preceding instruction.

8. A method as recited in claim 1, wherein said skipping step skips all operations between said preceding instruction and another instruction having an execution bit having said particular state.

9. A method as recited in claim 8, wherein said skipping step is performed by toggling a bit in a register upon detection of an activation bit in said particular state and iteratively comparing execution bits of instructions with said bit in said register.

10. A method as recited in claim 1, wherein a plurality of execution bits are provided in each instruction by said processing step and said skipping step is performed in accordance with a number represented by said plurality of execution bits.

* * * * *